United States Patent
Holst et al.

(10) Patent No.: US 6,669,311 B2
(45) Date of Patent: Dec. 30, 2003

(54) METHOD AND SYSTEM FOR OPERATING AN ELECTRICALLY CONTROLLED PRESSURIZED-FLUID BRAKE SYSTEM

(75) Inventors: Hans Holst, Seelze (DE); Axel Stender, Hameln (DE); Norbert Witte, Lauenau (DE)

(73) Assignee: WABCO GmbH & Co., OHG, Hannover (DE)

( * ) Notice: Subject to any disclaimer, the term of this patent is extended or adjusted under 35 U.S.C. 154(b) by 0 days.

(21) Appl. No.: 10/292,855

(22) Filed: Nov. 12, 2002

(65) Prior Publication Data

US 2003/0094853 A1 May 22, 2003

(30) Foreign Application Priority Data

Nov. 17, 2001 (DE) .......................... 101 56 673

(51) Int. Cl.$^7$ ................................. B60T 8/60
(52) U.S. Cl. .................... 303/155; 303/3; 303/9.66
(58) Field of Search ......................... 303/3, 7, 9.63, 303/9.66, 122.08, 127, 155, 114.3

(56) References Cited

U.S. PATENT DOCUMENTS

| | | | |
|---|---|---|---|
| 4,678,243 A | * | 7/1987 | Leiber ..................... 303/113.4 |
| 5,615,931 A | * | 4/1997 | Stumpe et al. ............ 303/22.1 |
| 5,855,420 A | * | 1/1999 | Lawrence ................. 303/113.4 |
| 6,129,425 A | * | 10/2000 | Onuma ....................... 303/155 |
| 6,256,571 B1 | * | 7/2001 | Fischer et al. .............. 303/155 |
| 6,357,840 B1 | * | 3/2002 | Atkins ........................ 303/149 |
| 6,434,456 B1 | * | 8/2002 | Babala et al. ................. 701/34 |
| 6,457,785 B1 | * | 10/2002 | Yonemura et al. .......... 303/182 |

FOREIGN PATENT DOCUMENTS

| | | |
|---|---|---|
| DE | 44-17-667 A1 | 11/1995 |
| DE | 196-37-484 A1 | 3/1998 |

* cited by examiner

*Primary Examiner*—Jack Lavinder
*Assistant Examiner*—Benjamin A Pezzlo
(74) *Attorney, Agent, or Firm*—Kramer Levin Naftalis & Frankel LLP

(57) ABSTRACT

A method and system for operating an electrically controlled pressurized-fluid vehicle brake system having a brake cylinder for actuating a brake, a braking-pressure sensor for obtaining braking-pressure data which indicate the braking pressure in the brake cylinder, a valve device for influencing the braking pressure by which the brake cylinder can communicate optionally with a supply pressure or with a set pressure in order to feed pressurized fluid, and a set-pressure sensor for obtaining set-pressure data. Braking pressure is adjusted as dictated by the set-pressure data and/or by the braking-pressure data. The set-pressure data are checked by temporarily switching the pressurized-fluid feed path to the brake cylinder from the supply pressure to the set pressure by actuation of at least one part of the valve device, and then monitoring the resulting braking pressure based on the braking-pressure data.

18 Claims, 2 Drawing Sheets

METHOD AND SYSTEM FOR OPERATING AN ELECTRICALLY CONTROLLED PRESSURIZED-FLUID BRAKE SYSTEM

BACKGROUND OF THE INVENTION

The present invention is directed generally to an improved method and system for operating an electrically controlled pressurized-fluid brake system for a vehicle.

DE 196 37 484 A1, which is incorporated herein by reference, discloses a pressurized-fluid brake system for a tractor-trailer combination in which the braking pressure in the brake cylinder is adjusted by means of a valve device based on a set-pressure command. The set pressure is transmitted by a pressure-supply conduit of the tractor vehicle to the trailer vehicle coupled thereto. This set pressure represents the intensity of brake actuation by the vehicle operator of the tractor vehicle.

A set-pressure sensor is provided, in or on the trailer vehicle, for sensing the set pressure. The set-pressure sensor delivers set-pressure data representing the set pressure to an electrical controller used to control the pressurized-fluid brake system of the trailer vehicle. The controller controls electrically actuatable valve devices in such a way that braking pressure corresponding to the set pressure is established in the brake cylinder. During normal operation, the feed of pressurized fluid is ensured by the fact that pressurized fluid is obtained from a master cylinder of the pressurized-fluid brake system of the trailer vehicle.

By virtue of the electrical control of braking pressure, the brake system responds faster than is the case in conventional actuation purely by pressurized fluid, and it can be actuated dynamically, since pneumatic dead times can be greatly reduced. As a safeguard against disturbances in the electrical controller, a changeover valve is provided by which the feed of pressurized fluid to the brake cylinder from the master cylinder can be switched to set pressure. In such case, the brake system is actuated purely pneumatically, as in conventional pressurized-fluid brake systems.

In normal operation, when the pressurized-fluid brake system is under electrical control, the set-pressure sensor has an important role in the functional reliability of the brake system, since the data delivered by this sensor are used to control the braking pressure in the brake cylinder and, thus, the deceleration of the vehicle. It is therefore important that the data delivered by the set-pressure sensor be checked for accuracy. To this end, in a known arrangement, there is disposed in a pressurized-fluid path conveying the set pressure, not only the set-pressure sensor but also a pressure switch, which delivers a digital switching signal at a particular pressure threshold. This pressure threshold is selected to be close to the response threshold of the electrical controller, an example being 0.7 bar. The pressure threshold can also be selected within the range of the response pressure of the pressurized-fluid brake, an example being 0.2 bar.

An important function of the pressure switch is to recognize and prevent that dangerous condition in which the set pressure is 0 bar, because the vehicle operator has not actuated the brake system of the vehicle, but, nevertheless, a much higher set pressure is being signaled, because a defect, for example, is causing the set-pressure sensor to deliver erroneous set-pressure data to the controller. To ensure that the controller does not adjust the braking pressure to correspond to incorrect set-pressure data, the controller additionally samples the signal of the pressure switch and, in this way, can recognize that the set pressure is actually lower than the switching threshold of the pressure switch, signifying that the brake cylinder is not to be filled with pressurized fluid and, thus, that braking is not to be initiated.

While the foregoing has already been developed to a highly safe and reliable level, the use of a pressure switch in addition to the set-pressure sensor represents increased equipment complexity. It is also conceivable that the pressure switch could be defective, thus necessitating additional safety and plausibility checks between the signals of the pressure switch and of the set-pressure sensor.

It is desired to provide an improved method and system for operating an electrically controlled pressurized-fluid brake system which achieve high functional reliability of the brake system while minimizing equipment complexity, and, in particular, without the need for a pressure switch.

SUMMARY OF THE INVENTION

Generally speaking, in accordance with the present invention, a method and system for operating an electrically controlled pressurized-fluid brake system are provided which improve over prior art methods and systems.

Hereinafter, the term "brake" will be used in its broadest sense to mean not only the components directly involved in vehicle braking, such as brake drums and brake shoes, but also brake-applying devices, such as brake cylinder and transmission parts, such as brake rods, brake shafts and brake cams.

In a preferred embodiment of the present invention, a method is provided for operating an electrically controlled pressurized-fluid vehicle brake system having brake cylinders actuatable by pressurized fluid for actuating the vehicle brakes, braking-pressure sensors for obtaining braking-pressure data representing braking pressure in the brake cylinders, valve devices for influencing braking pressure, the brake cylinders being in communication with the valve devices with a supply pressure and/or a set pressure in order to feed pressurized fluid, and set-pressure sensors for obtaining set pressure data, the braking pressure being adjusted based on the set-pressure data and/or the braking-pressure data. The inventive method includes the steps of checking the set-pressure data by temporarily switching pressurized-fluid feed to the brake cylinders from the supply pressure to the set pressure by actuation of at least one part of the valve devices, and monitoring resulting braking pressure on the basis of the braking-pressure data.

The present invention has the advantage that additional elements such as the pressure switch for checking set-pressure data are not required. Checking can be accomplished purely by means of appropriately programmed software for the electrical controller, and, thus, can be implemented simply and inexpensively. A brake-pressure sensor, which is present in any case and is necessary in any case for precise adjustment of the braking pressure in the brake cylinder, can also be used as a redundant sensor element for checking the set-pressure data.

The present invention can be used in trailer vehicles as well as in tractor vehicles.

In another embodiment of the present invention, all pressure sensors, the electrical controller and also the valve device are structurally integrated into a single compact control module.

According to another embodiment of the present invention, the brake cylinder is vented slightly just before any intended filling of the brake cylinder from the set pressure. In this way, it is possible in simple manner to detect set-pressure data that are too-high. A further advantage of this embodiment is that pressure data that are too-low or too-high can be recognized with a single changeover to set pressure.

If the set-pressure data are too high, the data delivered by the set-pressure sensor are higher than the actual set pressure. Because of the attempt to fill the brake cylinder from set pressure, the braking pressure cannot be raised sufficiently to the level that existed before venting, and in some cases a drop of braking pressure may occur. At the very least, the expected brake-pressure rise to the pressure level adjusted before venting will not occur. The controller can recognize this as defective behavior.

If the set-pressure data are too low, the set-pressure data indicate a pressure lower than the actual set pressure. Prolonged filling of the brake cylinder from set pressure can cause the braking pressure to rise to a pressure level above the pressure established before venting. The controller can also recognize this as defective behavior.

In another embodiment of the present invention, venting is performed within the hysteresis range of the brake; that is, it is kept sufficiently small so that hysteresis does not lead to a change in braking force of the brake despite reduction of braking pressure. Under these conditions, cyclically recurring checks of the set-pressure data obtained by the set-pressure sensor can be performed arbitrarily during a braking action, without resulting in a perceptible reaction from the vehicle.

Accordingly, it is an object of the present invention to provide a method and system for operating an electrically controlled pressurized-fluid brake system which achieve high functional reliability of the brake system.

It is also an object of the present invention to provide a method and system for operating an electrically controlled pressurized-fluid brake system that are cost effective and minimize equipment complexity, in particular, by eliminating the need for a pressure switch.

It is a further object of the present invention to provide a method and system for operating an electrically controlled pressurized-fluid brake system that enable the integration of parts into a single compact module.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

Figure 1:
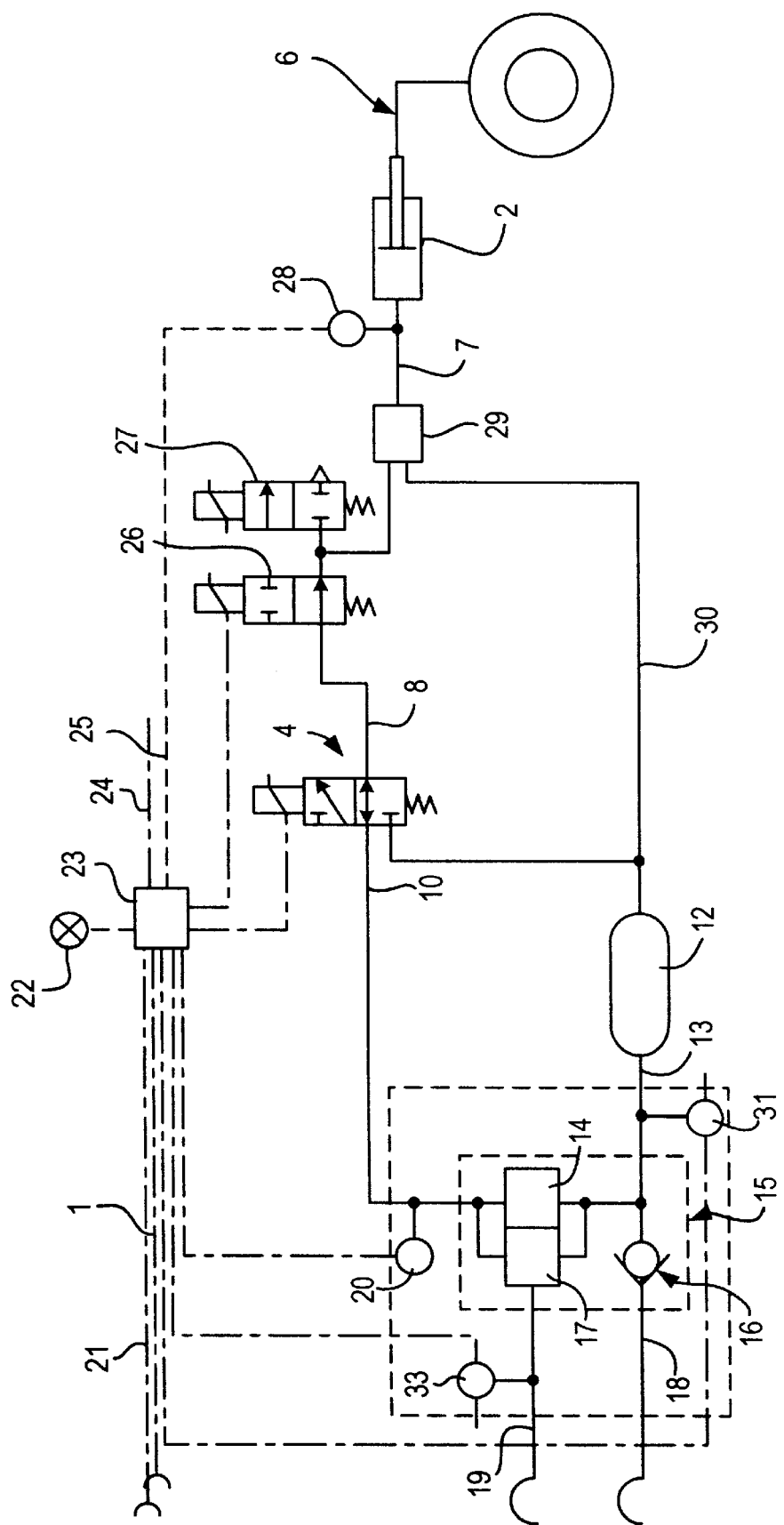
FIG. 1 is a schematic diagram of an electrically controlled pressurized-fluid brake system in accordance with one embodiment of the present invention.

Referring to the drawing figures where like reference numerals are used for corresponding parts, and where electrical conductors are represented by broken lines and pressure-conveying conduits are represented by solid lines, FIG. 1 shows a brake system according to the present invention illustrated on the basis of a pneumatic two-conduit trailer brake system. More particularly, the inventive trailer brake system depicted in FIG. 1 includes a conventional pneumatic two-conduit trailer brake system construction expanded to include an electrical actuating device.

The conventional two-conduit trailer brake system construction includes a brake 6 containing a brake cylinder 2, a supply conduit 18, a safety device 16, a master cylinder 12, a pneumatic brake conduit 19, an actuating valve 17, an emergency-brake device 14 and further pressure conduits 13, 10, 30, 7, 8. The electrical actuating device according to the present invention comprises a controller 23, an electrical power supply via electrical conductors 1, 21, pressure sensors 20, 28, 31, 33, which convert any measured pressure into an electrical signal and deliver it to controller 23, a warning light 22, electrically actuatable valve device 4, 26, 27, 29, the associated electrical conductors 24, 25 for connection to controller 23, and further pressure conduits.

Supply conduit 18 is in communication with master cylinder 12 via safety device 16. Safety device 16, which conventionally can be a nonreturn valve as shown in FIG. 1, allows flow of pressurized-fluid from supply conduit 18 to master cylinder 12, but prevents flow in the opposite direction.

Emergency-brake device 14 is constructed as a relay valve that responds to a pressure drop—a standard design. Emergency-brake device 14 is in communication on the supply side with master cylinder 12 via pressure conduit 13, and, on the output side, with valve device 4, 26, 27, 29 via pressure conduit 10. On the control side, emergency-brake device 14 is connected to supply conduit 18.

Actuating valve 17 is also constructed as a relay valve— also a standard design. On the supply and output sides, actuating valve 17 is in communication with pressure conduits 13 and 10, respectively, in the same manner as emergency-brake device 14. On the control side, actuating valve 17 is connected to pneumatic brake conduit 19. On the output side, actuating valve 17 delivers a set pressure ($p_{set}$) to pressure conduit 10.

Safety device 16, emergency-brake device 14 and actuating valve 17 are commonly combined as a structural unit referred to as a "trailer control valve," indicated in FIG. 1 by a broken line surrounding these elements.

The electrical supply of the electrical actuating device is depicted in FIG. 1 as electrical supply conductors 1 and 21. In operating condition, conductors 1 and 21 are connected to the tractor vehicle, or, more precisely, to the electrical system thereof, so that the electrical supply of the electrical actuating device is provided from the tractor vehicle. The electrical supply can also be assured, however, by an autonomous electrical system of the trailer, in the form, for example, of a trailer battery. What is important is that the electrical supply continuously provides power to the electrical actuating device in operating condition. Such an electrical supply is employed, for example, in trailer brake systems with anti-lock capability.

Valve device 4, 26, 27, 29 preferably comprises a changeover valve 4 designed as an electromagnetically actuatable 3/2-way valve, a first electrically actuatable 2/2-way valve 26, which functions as the inlet valve, a second electrically actuatable 2/2-way valve 27, which functions as the outlet valve, and a relay valve 29. A supply pressure ($p_{supply}$) is fed from master cylinder 12 to relay valve 29 via pressure conduit 30. A control pressure is fed to relay valve 29 from valves 26, 27 via a further pressure conduit. On its output side, relay valve 29 delivers to brake cylinder 2, via a pressure conduit 7, a braking pressure ($p_{braking}$) which corresponds to the control pressure adjusted by valves 26, 27, while the pressurized-fluid flow to brake cylinder 2 is drawn from master cylinder 12.

Changeover valve 4 functions to switch the pressure conveyed via pressure conduit 8 to valves 26, 27 between the supply pressure ($p_{supply}$) on the one hand or the set pressure ($p_{set}$) on the other hand. The switch position of changeover valve 4 illustrated in FIG. 1 indicates communication with the set pressure ($p_{set}$) via pressurized-fluid conduit 10. In the event of failure or disturbance of controller 23, changeover valve 4 switches to its position shown in FIG. 1, thus allowing braking-pressure control in the conventional pneumatic manner via trailer control valve 15. The feed of pressurized fluid to the brake cylinder then takes place via pressure conduit 10, changeover valve 4, pressure conduit 8, valve 26, which is in open position during failure or disturbance of the electrical system, and relay valve 29. In this case, valve 27 is switched to closed position, as illustrated in FIG. 1.

The function of pressure sensor 20 is to obtain, for controller 23, input data which indicate the set pressure ($p_{set}$) delivered by trailer control valve 15 and according to which controller 23 regulates the pressure to be adjusted in brake cylinder 2. The function of pressure sensor 28 is to obtain, for controller 23, further input data which indicate the braking pressure ($p_{braking}$) present at the time in brake cylinder 2. Hereinafter, pressure sensor 20 will be referred to as the "set-pressure sensor," and the data delivered by it as the set-pressure data ($D_{set}$); and pressure sensor 28 will be referred to as the "braking-pressure sensor," and the data delivered by it as the braking-pressure data ($D_{braking}$).

Controller 23 compares the braking-pressure data ($D_{braking}$) with the set-pressure data ($D_{set}$) and, by actuation of valves 26, 27, brings about any necessary adaptation of the braking pressure ($p_{braking}$). Optionally, a pressure sensor 33 can be provided for additional sensing of the pressure present upstream from trailer control valve 15 in the braking-pressure conduit. As another option, a pressure sensor 31 can be provided for sensing the supply pressure ($p_{supply}$).

The brake system according to the embodiment of the present invention depicted in FIG. 1 functions in the following manner. If braking is not supposed to be taking place, or if a disturbance of the electrical system exists, then changeover valve 4 is switched so that the set pressure ($p_{set}$) is conveyed via pressure conduits 10, 8 to valve 26, which in this case is switched to open position. Under these conditions, valve 27 is switched to closed position. Braking can then take place purely pneumatically.

When braking is initiated, for example by actuation of the foot-brake valve in the tractor vehicle, the pressure present in brake conduit 19 rises to a value desired by the vehicle operator. Via trailer control valve 15, this pressure is transmitted as the set pressure ($p_{set}$) into pressure conduit 10. If the electrical system is functional, the set pressure ($p_{set}$) present at the time is sent as the set-pressure data ($D_{set}$), in the form of an electrical signal, by set-pressure sensor 20 to controller 23. Controller 23 recognizes set-pressure data ($D_{set}$) above the response threshold, such as, for example, 0.7 bar, and thereupon switches changeover valve 4 in such a way that the supply pressure ($p_{supply}$) is conveyed via pressure conduit 8 to valves 26, 27. By appropriate actuation of valves 26, 27, controller 23 then adjusts the braking pressure ($p_{braking}$) in brake cylinder 2 to a value that corresponds to the set pressure ($p_{set}$) indicated by the set-pressure data ($D_{set}$). For this purpose, controller 23 compares the braking-pressure data ($D_{braking}$) signaled by pressure sensor 28 with the set-pressure data ($D_{set}$). In the event of a change of the set pressure ($p_{set}$) injected via brake conduit 19 into the brake system according to the present invention, as recognized by controller 23 due to changing set-pressure data ($D_{set}$), controller 23 corrects the braking pressure ($p_{braking}$) to the set pressure ($p_{set}$) by actuation of valves 26, 27.

It should be understood that, during vehicle operation, further pressure-influencing functions can be superposed on such pressure regulation. Examples include anti-lock brake regulation or distribution of braking force as a function of axle load. In such cases, controller 23 can also adjust the braking pressure ($p_{braking}$) in brake cylinder 2 to a value different from the set pressure ($p_{set}$).

In the case of a defect in set-pressure sensor 20, the set-pressure data ($D_{set}$) signaled to controller 23 may be considerably higher than the set pressure ($p_{set}$) that actually exists and that was established when the vehicle operator actuated the brakes. Without appropriate safety measures, it would then be possible for controller 23 to admit a braking pressure ($p_{braking}$) to brake cylinder 2, even though the vehicle operator actually does not intend a braking action. In order to recognize this and other defects in set-pressure sensor 20 and to prevent undesired effects on the brake system according to the present invention, the set-pressure data ($D_{set}$) are checked in the manner described hereinafter on the basis of FIG. 2.

Figure 2:
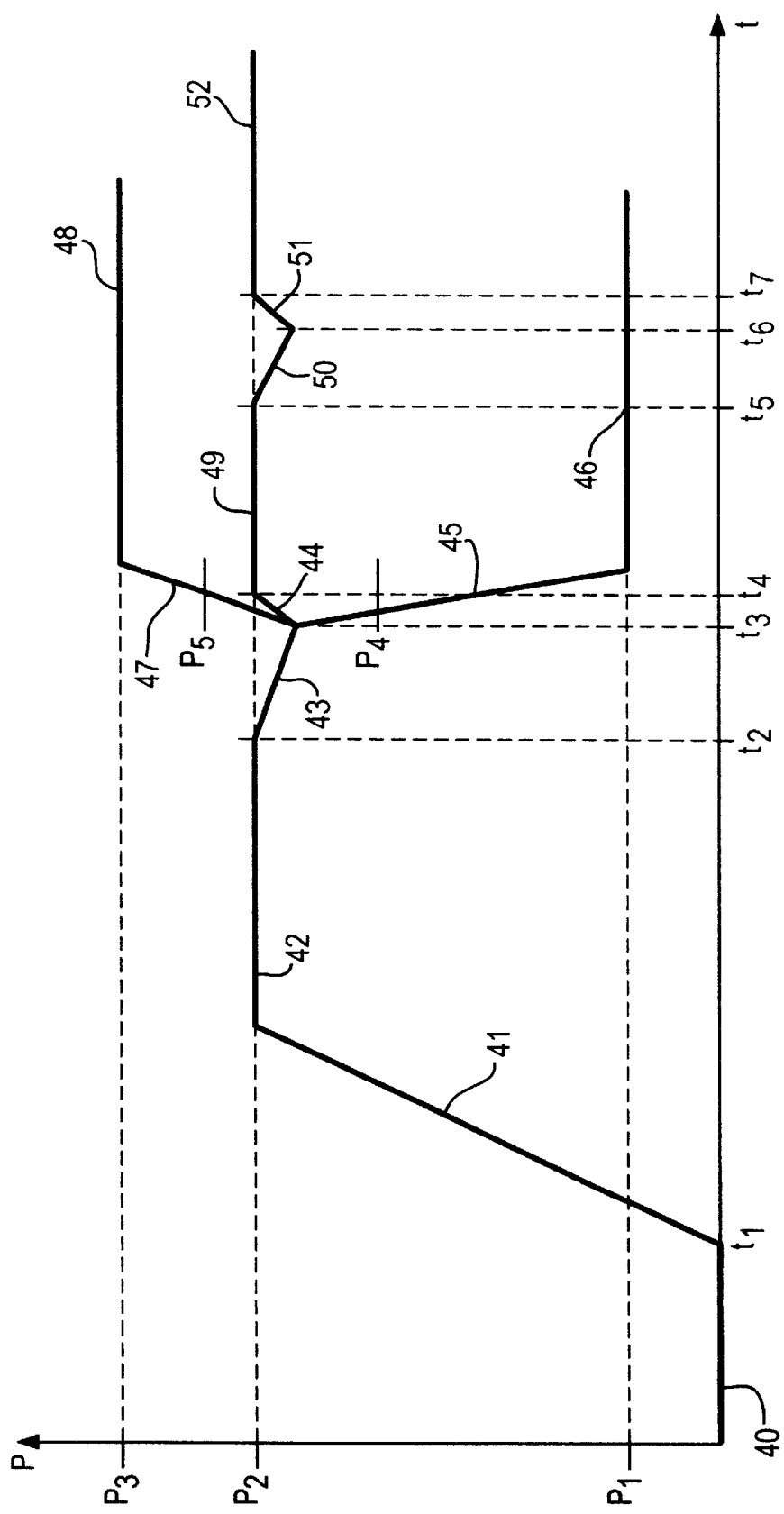
FIG. 2 is a graphical representation showing variations of set pressure and braking pressure over time in accordance with an embodiment of the method and system according to the present invention.

FIG. 2 shows the variation of the set-pressure data ($D_{set}$) and of the braking-pressure data ($D_{braking}$) over time. In FIG. 2, the ordinate represents pressure values and the abscissa time values. Line 40 represents an operating phase of the inventive brake system, beginning at time t=0 and continuing to t=$t_1$, during which both the set-pressure data ($D_{set}$) and the braking-pressure data ($D_{braking}$) have the value zero. At time t=$t_1$, the set-pressure data ($D_{set}$) rise to pressure value ($p_2$). Controller 23 corrects the braking pressure ($p_{braking}$) quasi-instantaneously, and so the braking-pressure data ($D_{braking}$) undergo the same rise starting from time t=$t_1$. Both pressure-data variations ($D_{set}$, $D_{braking}$) are represented by line 41 in FIG. 2. After reaching pressure level ($p_2$), the braking-pressure data ($D_{braking}$) and the set-pressure data ($D_{set}$) remain constant and follow line 42.

Time t=$t_1$ also marks the point at which a timer in controller 23 is started to measure the time from the beginning of braking, represented by the rise of the set-pressure data ($D_{set}$). After a preselected waiting time ($t_2-t_1$) has elapsed, this timer initiates, at time t=$t_2$, a test cycle to check the set-pressure data ($D_{set}$). To ensure a rapid check, a very short value, as little as zero, can also be selected for the waiting time.

In summary, the test cycle comprises switching changeover valve 4 from the supply pressure ($p_{supply}$) to the set pressure ($p_{set}$), venting by actuation of outlet valve 27, pressurizing by actuation of inlet valve 26, observing the variation of the braking-pressure data ($D_{braking}$) and, if no error has been recognized, switching changeover valve 4 back to the supply pressure ($p_{supply}$).

It should be understood that the method according to the present invention can also be used advantageously even without the test cycle. For example, a braking-pressure change caused by braking requirements of the vehicle operator can be used as reference for checking the set-pressure data ($D_{set}$). The use of one or more test cycles, which preferably are initiated at fixed time intervals, has the advantage that the check of the set-pressure data ($D_{set}$) can be performed at definite times, and, thus, a definite error-recognition time can be achieved. Accordingly, errors can be recognized more rapidly.

At the beginning of the test cycle, at time $t=t_2$, controller 23, acting through changeover valve 4, switches the pressurized-fluid feed to brake cylinder 2 from the supply pressure ($p_{supply}$) to the set pressure ($p_{set}$). In the embodiment depicted in FIG. 2, it is assumed that the vehicle operator's wish for braking action does not change after time $t=t_1$, so that, inherently, no change of the braking pressure ($p_{braking}$) is necessary in the present operating condition. Thus, both inlet valve 26 and outlet valve 27 are in closed position, and no change of the braking pressure ($p_{braking}$) is possible for the time being, regardless of the set pressure ($p_{set}$) that is present. In order that the check of the set-pressure data ($D_{set}$) can be performed, a slight change of the braking pressure ($p_{braking}$) is brought about artificially by venting, for which purpose outlet valve 27 is opened temporarily between times $t=t_2$ and $t=t_3$. Accordingly, the braking pressure ($p_{braking}$) in the brake cylinder is lowered by, for example, 0.5 bar, and this is signaled to controller 23 by corresponding braking-pressure data ($D_{braking}$). In FIG. 2, this braking-pressure drop is represented by line 43. The braking-pressure drop is preferably limited to a relatively small value, to ensure that the braking force present at the braked vehicle wheel is not altered by hysteresis of brake 6.

Starting at time $t=t_3$, outlet valve 27 is closed and inlet valve 26 is opened. Pressurized-fluid feed to brake cylinder 2 takes place via pressure conduits 10, 8 from the set pressure ($p_{set}$). If the brake system, and especially pressure sensor 20 is functioning properly, a braking pressure ($p_{braking}$) corresponding to pressure level ($p_2$) will be re-established after a short time, that is, at time $t=t_4$. This behavior, which is typical of the error-free condition, is illustrated by line 44 in FIG. 2.

In the error-free case, changeover valve 4 will be switched back at time $t=t_4$, so that pressurized-fluid feed to brake cylinder 2 from master cylinder 12 can take place. Thereafter, the braking pressure ($p_{braking}$) remains steady at pressure level ($p_2$) for a certain time, unless the vehicle operator requires different braking pressures. The timer is also restarted at time $t=t_4$. After a further waiting time ($t_5-t_4$), that is, at time $t=t_5$, controller 23 initiates a further test cycle in the manner described above, as illustrated by lines 50, 51, 52 in FIG. 2.

In the event of a defect in set-pressure sensor 20 or other parts of the brake system, a distinction can be made between two cases. In the first case, set-pressure sensor 20 signals set-pressure data ($D_{set}$) that are too-high to controller 23; and, in the second case, set-pressure sensor 20 signals set-pressure data ($D_{set}$) that are too-low to controller 23.

In the first case, starting at time $t=t_3$, the braking-pressure data ($D_{braking}$) would vary according to line 45 in FIG. 2, since the available set pressure ($p_{set}$) is actually lower than signaled by set-pressure sensor 20. For example, the available pressure could be at pressure level ($p_1$), whereupon, as a result of the attempt to feed pressurized fluid from the set pressure ($p_{set}$) to brake cylinder 2, the braking pressure ($p_{braking}$) would drop to this pressure level ($p_1$), as indicated by lines 45, 46. For safety reasons, however, controller 23 already recognizes a malfunction of set-pressure sensor 20 at pressure level ($p_4$), and thereupon activates warning light 22. Moreover, controller 23 switches the brake system to the conventional mode of operation, free of electrical control.

In the second case, starting at time $t=t_3$, the braking-pressure data ($D_{braking}$) would vary according to lines 47, 48, since the available set pressure ($p_{set}$) is actually higher than signaled by set-pressure sensor 20. For example, the available pressure could be at pressure level ($p_3$), whereupon the braking pressure ($p_{braking}$) in brake cylinder 2 would rise according to line 47 as far as pressure level ($p_3$), where it would then remain steady, as indicated by line 48. As soon as pressure level ($p_5$) is reached, however, the controller recognizes a malfunction of set-pressure sensor 20, and thereupon activates warning light 22 and switches the brake system to the conventional mode of operation.

By means of the described check of the set-pressure data ($D_{set}$), it is possible to recognize not only defects in set-pressure sensor 20, but also a large number of interfering influences that affect these data. Examples include errors in characteristic and offset, or even electromagnetic interference.

It should be understood that the time of the first test cycle and of the subsequent test cycles as well as the time intervals between them can be defined as a function of the vehicle length.

Accordingly, the present invention provides an improved method and system for operating an electrically controlled pressurized-fluid vehicle brake system that achieve high functional reliability of the brake system, and that avoid undue equipment complexity and cost, including by eliminating the need for a pressure switch. The inventive method and system also enable the integration of parts into a single compact module.

It will thus be seen that the objects set forth above, among those made apparent from the preceding description, are efficiently attained, and since certain changes may be made in carrying out the above method and in the constructions set forth without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for operating an electrically controlled pressurized-fluid vehicle brake system having at least one brake, at least one brake cylinder actuatable by pressurized fluid for actuating said at least one brake, at least one braking-pressure sensor for obtaining braking-pressure data representing braking pressure in said at least one brake cylinder, at least one valve device for influencing said braking pressure, said at least one brake cylinder in communication via said at least one valve device with at least one of a supply pressure and a set pressure in order to feed pressurized fluid, and at least one set-pressure sensor for obtaining set pressure data representing said set pressure, said braking pressure being adjusted based on at least one of said set-pressure data and said braking-pressure data, the method comprising the steps of checking said set-pressure data by temporarily switching pressurized-fluid feed to said brake cylinder from said supply pressure to said set pressure by actuation of at least one part of said at least one valve device, and monitoring resulting braking pressure on the basis of said braking-pressure data.

2. The method according to claim 1, wherein said step of switching said pressurized-fluid feed from said supply pressure to said set pressure is performed during a vehicle braking action.

3. The method according to claim 1, wherein said step of checking said set-pressure data includes admitting said set pressure into said at least one brake cylinder by actuating at least one part of said at least one valve device.

4. The method according to claim 3, further comprising the step of partially venting said at least one brake cylinder before admitting said set pressure into said at least one brake cylinder.

5. The method according to claim 4, wherein said step of venting said at least one brake cylinder is performed within a hysteresis range of said at least one brake.

6. The method according to claim 1, wherein said step of switching said pressurized-fluid feed from said supply pressure to said set pressure is performed only when said set-pressure data indicate that said set pressure is one of equal to and greater than a response pressure of said brake system.

7. The method according to claim 1, wherein said step of checking said set-pressure data is performed by monitoring the difference between said braking-pressure data and said set-pressure data and recognizing an error if said difference exceeds a preselected threshold.

8. The method according to claim 1, wherein said step of switching said pressurized-fluid feed from said supply pressure to said set pressure is performed during preselected test cycles, the time interval between said test cycles being a function of the length of said vehicle.

9. The method according to claim 8, wherein one of said preselected test cycles is performed after the beginning of vehicle braking at the end of a preselected waiting time based on the length of conduit between said set-pressure sensor and said at least one valve device.

10. An electrically controlled pressurized-fluid vehicle brake system comprising at least one brake, at least one brake cylinder actuatable by pressurized fluid for actuating said at least one brake, at least one braking-pressure sensor for obtaining braking-pressure data representing braking pressure in said at least one brake cylinder, at least one valve device for influencing said braking pressure, said at least one brake cylinder in communication via said at least one valve device with at least one of a supply pressure and a set pressure in order to feed pressurized fluid, at least one set-pressure sensor for obtaining set pressure data representing said set pressure, said braking pressure being adjusted based on at least one of said set-pressure data and said braking-pressure data, means for checking said set-pressure data including means for temporarily switching pressurized-fluid feed to said brake cylinder from said supply pressure, and means for monitoring resulting braking pressure on the basis of said braking-pressure data.

11. The system according to claim 10, wherein said means for switching said pressurized-fluid feed from said supply pressure to said set pressure functions during a vehicle braking action.

12. The system according to claim 10, wherein said means for switching pressurized-fluid feed to said brake cylinder from said supply pressure to said set pressure includes means for actuating at least one part of said at least one valve device to admit said set pressure into said at least one brake cylinder.

13. The system according to claim 12, further comprising means for partially venting said at least one brake cylinder before admitting said set pressure into said at least one brake cylinder.

14. The system according to claim 13, wherein said means for partially venting said at least one brake cylinder function within a hysteresis range of said at least one brake.

15. The system according to claim 10, wherein said means for switching said pressurized-fluid feed from said supply pressure to said set pressure functions only when said set-pressure data indicate that said set pressure is one of equal to and greater than a response pressure of said brake system.

16. The system according to claim 10, wherein said means for checking said set-pressure data includes means for monitoring the difference between said braking-pressure data and said set-pressure data and to recognize an error if said difference exceeds a preselected threshold.

17. The system according to claim 10, wherein said means for switching said pressurized-fluid feed from said supply pressure to said set pressure functions during preselected test cycles, the time interval between said test cycles being a function of the length of said vehicle.

18. The system according to claim 17, wherein one of said preselected test cycles is performed after the beginning of vehicle braking at the end of a preselected waiting time based on the length of conduit between said set-pressure sensor and said at least one valve device.

* * * * *